United States Patent
Nolte et al.

(10) Patent No.: US 11,763,309 B2
(45) Date of Patent: Sep. 19, 2023

(54) SYSTEM AND METHOD FOR MAINTAINING A FRAUD RISK PROFILE IN A FRAUD RISK ENGINE

(71) Applicant: ENTERSEKT INTERNATIONAL LIMITED, Ebene (MU)

(72) Inventors: Dewald de Ridder Nolte, Pretoria (ZA); Gerhard Gysbert Oosthuizen, Bellville (ZA); Daniël Deetlefs Bester, Cape Town (ZA)

(73) Assignee: ENTERSEKT INTERNATIONAL LIMITED, Ebene (MU)

( * ) Notice: Subject to any disclaimer, the term of this patent is extended or adjusted under 35 U.S.C. 154(b) by 360 days.

(21) Appl. No.: 16/966,448

(22) PCT Filed: Jan. 30, 2019

(86) PCT No.: PCT/IB2019/050741
§ 371 (c)(1),
(2) Date: Jul. 30, 2020

(87) PCT Pub. No.: WO2019/150273
PCT Pub. Date: Aug. 8, 2019

(65) Prior Publication Data
US 2021/0042755 A1    Feb. 11, 2021

(30) Foreign Application Priority Data
Jan. 30, 2018   (ZA) .................................. 2018/00615

(51) Int. Cl.
*G06Q 20/00*      (2012.01)
*G06Q 20/40*      (2012.01)
(Continued)

(52) U.S. Cl.
CPC ..... *G06Q 20/4016* (2013.01); *G06Q 20/3825* (2013.01); *G06Q 20/3829* (2013.01); *H04L 9/3247* (2013.01); *H04L 2209/56* (2013.01)

(58) Field of Classification Search
CPC .......... G06Q 20/4016; G06Q 20/3825; G06Q 20/3829; H04L 9/3247; H04L 2209/56
(Continued)

(56) References Cited

U.S. PATENT DOCUMENTS

| 2011/0072274 A1 | 3/2011 | Leoutsarakos |
| 2013/0311764 A1 * | 11/2013 | Alpert ................. H04W 12/033 713/150 |

(Continued)

FOREIGN PATENT DOCUMENTS

WO   WO-2016155281 A1 * 10/2016 ............. H04L 63/06

OTHER PUBLICATIONS

Attached PDF for Reference (Year: 2016).*

*Primary Examiner* — Dante Ravetti
(74) *Attorney, Agent, or Firm* — Knobbe, Martens, Olson & Bear, LLP

(57) ABSTRACT

A system and method for maintaining a fraud risk profile in a fraud risk engine are described. In a method conducted at a remote server, a payload from a secure mobile application executing on a user mobile device associated with a user is received. The payload including contextual data having been obtained by the secure mobile application and a trust indicator linked to the contextual data. Validity of the contextual data is confirmed by verifying the trust indicator. If the trust indicator is verified, the contextual data is input into a fraud risk engine as truth data. The fraud risk engine maintains a fraud risk profile associated with the user. The fraud risk (Continued)

profile is usable by the fraud risk engine in evaluating a fraud risk associated with an activity associated with the user.

13 Claims, 3 Drawing Sheets

(51) Int. Cl.
    *G06Q 20/38*     (2012.01)
    *H04L 9/32*     (2006.01)

(58) Field of Classification Search
    USPC .......................... 705/16, 21, 59; 380/44, 262
    See application file for complete search history.

(56) References Cited

U.S. PATENT DOCUMENTS

2015/0350894 A1    12/2015    Brand
2015/0371228 A1    12/2015    Kershaw
2017/0357977 A1*  12/2017    Pitz .................... G06Q 20/4016

\* cited by examiner

SYSTEM AND METHOD FOR MAINTAINING A FRAUD RISK PROFILE IN A FRAUD RISK ENGINE

CROSS-REFERENCE(S) TO RELATED APPLICATIONS

This application claims priority from South African provisional patent application number 2018/00615 filed on 30 Jan. 2018, which is incorporated by reference herein.

FIELD OF THE INVENTION

This invention relates to a system and method for maintaining a fraud risk profile in a fraud risk engine.

BACKGROUND TO THE INVENTION

Fraud risk engines are typically employed in the art to analyse a range of indicators associated with an activity to determine the probability that the activity is fraudulent. Such risk engines can use a diverse range of data, for example in the case of a financial institution fraud risk engine, data relating to when a user typically logs in to an online facility hosted by the financial institution, data relating to how the user typically logs in, data relating to activity that is typical of the user (e.g. payments to a particular group of people, payments having amounts within a particular range, payments being made within a particular range of dates, etc.) and the like.

Traditional risk engines typically use a statistical model for risk scoring, such as naïve Bayesian, decision trees, neural networks and the like. Risk engines therefore typically build a statistics-based profile for each user which describes activity of the user that can be considered typical of the user. Any activity that does not fit the profile may be considered suspicious and may be flagged for some action (e.g. a higher level of authentication).

One problem associated with such risk engines is that a user's profile may lag behind his or her actual and legitimate conduct. Thus every time the user performs an activity which is atypical for that user, the risk engine may flag that conduct as suspicious and an action may be taken. This can naturally be inconvenient to the user and may increase friction experienced by the user in making use of the institution's services.

Further, such risk engines may be susceptible to so-called 'poisoning' where nefarious third parties feed spurious data to the risk engine in order to skew the user's profile so that it is less accurate.

Accordingly, there remains scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented method conducted at a remote server comprising: receiving a payload from a secure mobile application executing on a user mobile device associated with a user, the payload including contextual data having been obtained by the secure mobile application and a trust indicator linked to the contextual data; confirming the validity of the contextual data by verifying the trust indicator; and, if the trust indicator is verified, inputting the contextual data into a fraud risk engine as truth data, wherein the fraud risk engine maintains a fraud risk profile associated with the user, and wherein the fraud risk profile is usable by the fraud risk engine in evaluating a fraud risk associated with an activity associated with the user.

Further features provide for the trust indicator to be inextricably linked to the contextual data; for the trust indicator to include a digital signature of the contextual data and a digital certificate associated with the secure mobile application; for the digital certificate to be a registered digital certificate; and for confirming the validity of the contextual data by verifying the trust indicator to include verifying the digital signature using the digital certificate.

Truth data may refer to data the veracity of which has been attested to by a trusted element, in this case being the secure mobile application.

Further features provide for the digital certificate to have been compiled or created by the secure mobile application; and, for the digital certificate to be controlled by the secure mobile application.

Still further features provide for the contextual data to be associated with a data category; for inputting the contextual data into the fraud risk engine to include one or both of augmenting or replacing existing data associated with the same data category with the contextual data; for the fraud risk engine to use the truth data to update the fraud risk profile so as to expect activity of the user which is associated with the contextual data; for the fraud risk engine to correlate the truth data with conventional fraud risk data of the same category; and, for the method to include, if the correlation between the truth data and conventional fraud risk data is below a predetermined threshold, flagging the conventional fraud risk data as suspicious.

A yet further feature provides for verifying the trust indicator associated with the contextual data to include confirming the origin of the contextual data.

A further feature provides for the method to include receiving payloads from the secure mobile application periodically for continual inputting of contextual data as truth data into the fraud risk engine.

A still further feature provides for the contextual data to include one or more of: location data relating to a geographical location; user authentication data; connectivity data; and, user mobile device usage data.

A yet further feature provides for authentication data to include one or more of: behavioural biometrics; information relating to when the user last input authentication into the user mobile device; the type of authentication last used; and, an indication as the success or failure of the authentication.

An even further feature provides for the connectivity data to include one or more of: cellular network connectivity data, internet protocol connectivity data, and wireless communication network connectivity data.

A further feature provides for the geographical location data to include location data obtained from a geographical location element of the user mobile device.

A still further feature provides for user mobile device usage data to include one or more of: periods of high user mobile device usage, periods of low user mobile device usage, input element usage, battery discharge rate, and screen on-time.

In accordance with a further aspect of the invention there is provided a computer-implemented method conducted by a secure mobile application executing on a user mobile device comprising: obtaining contextual data from an element of the user mobile device; linking the contextual data with a trust indicator; compiling a payload including the contextual data and trust indicator; and, transmitting the payload to a remote server for verification of the trust indicator and input of the contextual data as truth data into a fraud risk engine, wherein the fraud risk engine maintains a fraud risk profile associated with a user associated with the user mobile device, and wherein the fraud risk profile is usable by the fraud risk engine in evaluating a fraud risk associated with an activity associated with the user.

Further features provide for the trust indicator to include a digital signature and a digital certificate associated with the secure mobile application, for linking the contextual data with the trust indicator to include generating a digital signature of the contextual data using the digital certificate, and for the digital certificate to be a registered digital certificate.

Further features provide for the contextual data to relate to use of the element of the user mobile device; for contextual data to be obtained from one or more elements; and, for the elements include one or both of elements within the secure mobile application or elements of the user mobile device which are external to the secure mobile application.

A still further feature provides for the method to include periodically obtaining contextual data for transmission to the remote server together with an associated digital signature.

Yet further features provide for generating the digital signature of the contextual data to use a private key having been generated by the secure mobile application and securely stored in a secure storage location of the user mobile device from where it is accessible by only authorized applications including the secure mobile application; and, for the digital certificate to include a public key corresponding to the private key for use in verifying the digital signature.

A system including a remote server having a memory for storing computer-readable program code and a processor for executing the computer-readable program code, the remote server comprising: a payload receiving component for receiving a payload from a secure mobile application executing on a user mobile device associated with a user, the payload including contextual data having been obtained by the secure mobile application and a trust indicator linked to the contextual data; a data validity confirming component for confirming the validity of the contextual data by verifying the trust indicator; and, a truth data input component for, if the trust indicator is verified, inputting the contextual data into a fraud risk engine as truth data, wherein the fraud risk engine maintains a fraud risk profile associated with the user, and wherein the fraud risk profile is usable by the fraud risk engine in evaluating a fraud risk associated with an activity associated with the user.

A system including a secure mobile application executing on a user mobile device having a memory for storing computer-readable program code and a processor for executing the computer-readable program code, the user mobile device comprising: a contextual data obtaining component for obtaining contextual data from an element of the user mobile device; a linking component for linking the contextual data with a trust indicator; a payload compiling component for compiling a payload including the contextual data and trust indicator; and, a payload transmitting component for transmitting the payload to a remote server for verification of the trust indicator and input of the contextual data as truth data into a fraud risk engine, wherein the fraud risk engine maintains a fraud risk profile associated with a user associated with the user mobile device, and wherein the fraud risk profile is usable by the fraud risk engine in evaluating a fraud risk associated with an activity associated with the user.

A computer program product comprising a computer-readable medium having stored computer-readable program code for performing the steps of: receiving a payload from a secure mobile application executing on a user mobile device associated with a user, the payload including contextual data having been obtained by the secure mobile application and a trust indicator linked to the contextual data; confirming the validity of the contextual data by verifying the trust indicator; and, if the trust indicator is verified, inputting the contextual data into a fraud risk engine as truth data, wherein the fraud risk engine maintains a fraud risk profile associated with the user, and wherein the fraud risk profile is usable by the fraud risk engine in evaluating a fraud risk associated with an activity associated with the user.

A computer program product comprising a computer-readable medium having stored computer-readable program code for performing the steps of: obtaining contextual data from an element of the user mobile device; linking the contextual data with a trust indicator; compiling a payload including the contextual data and trust indicator; and, transmitting the payload to a remote server for verification of the trust indicator and input of the contextual data as truth data into a fraud risk engine, wherein the fraud risk engine maintains a fraud risk profile associated with a user associated with the user mobile device, and wherein the fraud risk profile is usable by the fraud risk engine in evaluating a fraud risk associated with an activity associated with the user.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Aspects of this disclosure are directed towards big-data risk evaluation through the use of data which has been digitally signed for validation using a user's digital certificate. Signing the data for validation using a digital certificate may allow the data to be used as a positive indicator, or "green signal". That is, the signed data, once verified, can be considered to be "truth data" in that the veracity thereof has been attested to by a trusted element. In aspects of this disclosure, the trusted element is provided by the combination of a secure mobile application and associated digital certificate. The digital certificate may be created and/or controlled by the secure mobile application. In some implementations, the digital certificate may be controlled by the remote server via a software development kit (SDK) of the secure mobile application. One or both of the digital certificate and secure mobile application may be controlled by a trusted entity. The digital certificate may for example be susceptible to revocation by the secure mobile application and/or trusted entity at any stage.

Aspects of this disclosure provide a mechanism by which data may be signed by a trusted mobile application, using a trusted digital certificate, in some cases without user intervention. Accordingly, the data, which ordinarily may have been indicative of "out-of-the-ordinary behaviour", can instead be used as confirmation of a new status quo.

As will be explained in greater detail below, the data may be any contextual data (e.g. user has logged into app using biometric, user is in Russia, user has been interacting with the following person, the user's app is installed on this particular phone, the user's phone is connecting to the Internet via this IP address, the user's phone is proximate this NFC device, etc.). In some cases the data may relate to a transaction. The data may be gathered by the secure mobile application and signed, either periodically (e.g. in the background) or on demand.

Figure 1:
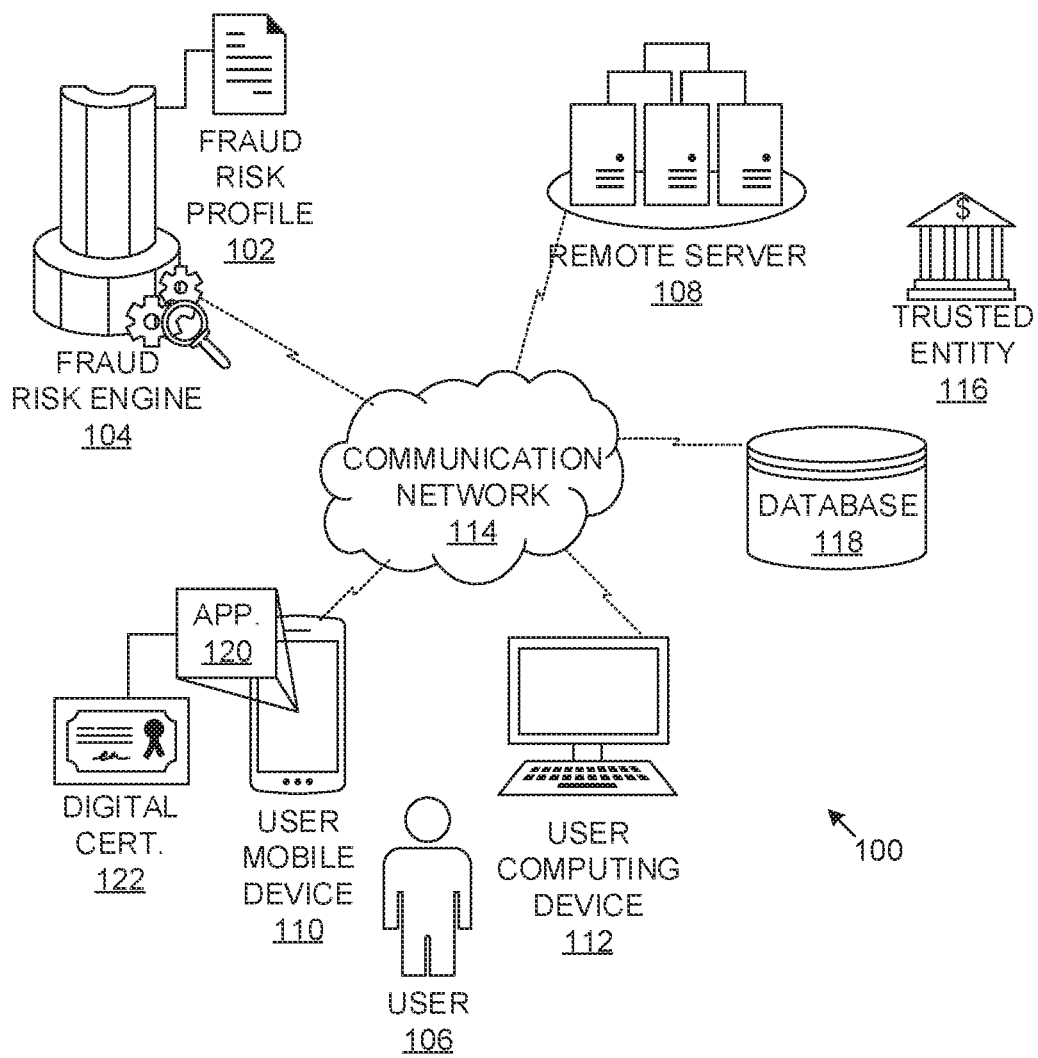
FIG. 1 is a schematic diagram which illustrates an exemplary system for maintaining a fraud risk profile in a fraud risk engine.

FIG. 1 is a schematic diagram which illustrates an exemplary system (100) for maintaining a fraud risk profile (102) in a fraud risk engine (104). The fraud risk profile (102) may be associated with a registered user (106) and may be usable by the fraud risk engine (104) in evaluating a fraud risk associated with an activity performed by the user (106). The fraud risk engine (104) may be maintained and/or operated by an entity (such as a financial institution) and the activity may include any interaction between the user (106) and this entity.

The fraud risk profile (102) may for example include a statistical model which is built up over time based on observations relating to the user's activity. The fraud risk profile (102) may be usable by the fraud risk engine to estimate a likelihood that a purported user activity is in fact an activity that is being performed by the user and/or a likelihood that the purported user activity is an activity being performed by a nefarious third-party masquerading as the user (106). The fraud risk profile (102) and/or engine may be configured to accommodate a truth or trust indication field and/or digital signature of the remote server associated with data which is to be used to update or evaluated against the fraud risk profile.

The system (100) may further include a remote server (108), a user mobile device (110) and in some cases a user computing device (112). The remote server (108), user mobile device (110) and user computing device (112) may be in data communication with each other via an appropriate communication network (114), such as the Internet.

The remote server (108) may be maintained by or generally under the control of a trusted entity (116). In some cases, the entities that maintain and/or control the fraud risk engine (104) and remote server (108) may be the same (i.e. a single entity maintains/controls both the fraud risk engine and the remote server) while in other cases the trusted entity (116) may provide a service for injecting truth data into a fraud risk engine controlled/maintained by another entity. In either event, the remote server (108) may be said to be associated with the fraud risk engine (104). The remote server (108) may be any suitable computing device configured to perform a server role. The remote server (108) may have access to a database (118) in which records of registered users may be stored. In some cases, a copy of a digital certificate (122) generated by user mobile device (110) or an identifier which uniquely identifies the digital certificate and/or mobile device may be stored in the database in association with the record of the registered user.

The remote server (108) may be configured and authenticated for input of data into the fraud risk engine. The fraud risk engine (104) may in turn be configured to authenticate the remote server (108) and accept data (e.g. truth data) therefrom.

The user mobile device (110) may generally be under the user's control and may be any suitable portable computing device with communication functionality. The user mobile device (110) may have a secure mobile application (120) resident therein and installed thereon. The secure mobile application (120) may be provided by the trusted entity (116) and consequently may be under the control of the trusted entity (116).

For example, the trusted entity (116) may be responsible for the development and maintenance of the secure mobile application (120). The trusted entity (116) may post the secure mobile application to a repository (e.g. such as Apple's App Store, "Apple" and "App Store" are trademarks of Apple, Inc.) from where it can be downloaded and installed. The trusted entity (116) may be responsible for updating the secure mobile application as may be required.

The secure mobile application (120) may be configured to generate its own digital certificate (122). This may occur the first time the application is installed on the user mobile device (110). Generating a digital certificate (122) may include the secure mobile application (120) generating a public and private key pair on the user mobile device (110).

The secure mobile application (120) may generate a unique public key and private key and may secure store the private key in a secure memory of the mobile device such that it cannot be accessed by unauthorized applications (which in some cases may entail only the secure mobile application (120) being permitted to access it). The private key may accordingly be known only to the secure mobile application (120). The digital certificate (122) may include the public key and may be registered with the trusted entity (116) during an enrollment process during which the user (106) is bound to the digital certificate (122), and hence the secure mobile application (120).

The digital certificate (122), including the public key generated by the secure mobile application, may be uniquely bound to the secure mobile application (120). As the user (106) can be assumed generally to be in control of the user mobile device (110) on which the application (120) is installed, the digital certificate (122) may be considered to be uniquely bound to the user. In this manner, data received from the secure mobile application (120) which has been signed using the digital certificate (122) can be verified as having originated from the user mobile device and hence from the user. Because the public and private key pair is generated by the secure mobile application (120) and involve a high degree of randomness, they may be used to uniquely identify the secure mobile application (120) and hence the user mobile device (110).

In some implementations, the secure mobile application (120) may be configured to compile data elements which make up the digital certificate and submit them to a certificate authority (CA) for creation of the digital certificate. The CA may be an independent CA or may be one provided by the trusted entity (116). The CA may issue the digital certificate (including the data elements compiled by the secure mobile application) to the secure mobile application.

The secure mobile application (120) may be configured to transmit a positive indicator or trust indicator, which may be in the form of data signed by the digital certificate (122), to the remote server (108) for injecting into the fraud risk engine (104). As the data has been signed by the secure mobile application (120) using the digital certificate (122) bound to the secure mobile application and user, and as the secure mobile application is under the control of the trusted entity (116), the signed data can be trusted and considered as confirmation of the event it describes. This may be because only the trusted secure mobile application (120) is able to sign and submit the data.

Figure 2:
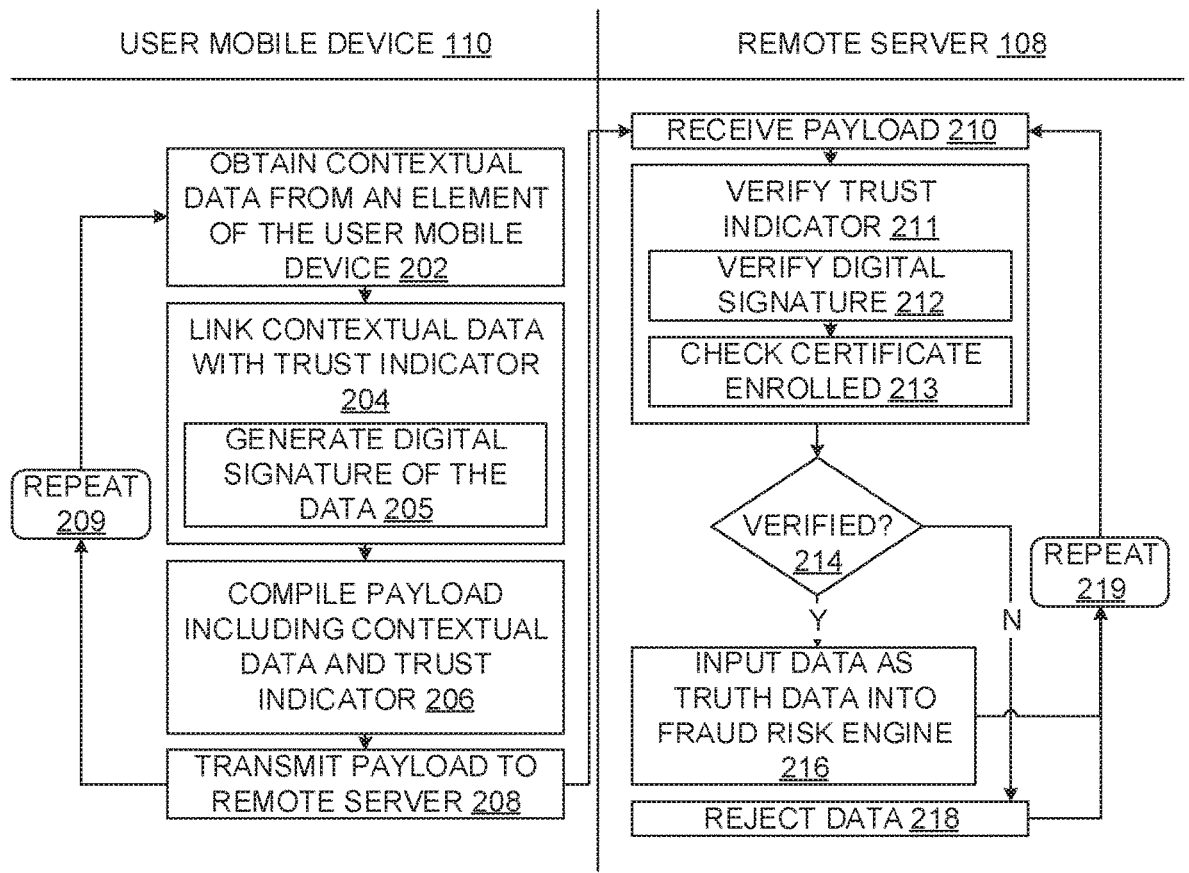
FIG. 2 is a swim-lane flow diagram which illustrates an exemplary method for maintaining a fraud risk profile in a fraud risk engine.

The system (100) described above may implement a method for maintaining a fraud risk profile in a fraud risk engine. An exemplary method for maintaining a fraud risk profile in a fraud risk engine is illustrated in the swim-lane flow diagram of FIG. 2, in which respective swim-lanes delineate steps, operations or procedures performed by respective entities or devices.

The secure mobile application (120) may obtain (202) contextual data from an element of the user mobile device (110). The element from which contextual data is obtained may be within (i.e. a part of) the secure mobile application or external to the application.

One example of an element includes an authentication element of the secure mobile application (120) which handles user authentication. The authentication element may for example be responsible for receiving and validating a user passcode (e.g. password, PIN, etc.), biometric information or other authentication information (such as behavioural biometric information). Contextual data obtained from the authentication element may include: when the user last authenticated him/herself, what form of authentication the user used, the success rate of user authentication over a predefined period (e.g. over the last day, how many successful and unsuccessful authentications have there been?), patterns relating to user authentication and the like. In some aspects, the contextual data may relate to behavioural biometric data which is usable in generating a behavioural biometric profile associated with the user and by way of which the user can be authenticated.

Another example of an element from which contextual data may be obtained includes a geographical location element of the user mobile device. Contextual data which may be obtained from such an element may include location data such as the geographical location of the user mobile device. The geographical location may be broad (e.g. in a particular country) or specific (e.g. in a particular retail store). The location data may be a current geographical location (which may be timestamped) or a geographical location history (with individual timestamps to date different locations).

A further example of an element from which contextual data may be obtained includes one or more communication elements. Connectivity data such as one or more of: cellular network connectivity data (e.g. cell tower identifier, cell signal strength, etc.), internet protocol (IP) connectivity data (e.g. IP address, etc.), and wireless communication network connectivity data (e.g. one or SSIDs within range, an IP address, signal strength, etc.) may be obtained from the communication element(s).

Yet another element from which contextual data may be obtained includes a device management element. Contextual data obtained from the device management element may include user mobile device usage data such as one or more of: periods of high user mobile device usage (e.g. a period of time during which the user mobile device is interacted with every, e.g. 10 minutes, 20 minutes, hour, etc.) periods of low user mobile device usage (e.g. a period of time during which the user mobile device is not interacted with for more than, e.g., 3 hours, 4 hours, etc.), input element usage (e.g. information relating to how a touch-sensitive keypad, microphone, etc. is used), battery discharge rate (e.g. patterns associated with discharge of the battery), screen on-time, and the like.

In some cases, contextual data may be obtained from a contactless element (e.g. NFC transceiver, etc.). Such contextual data may include data relating to the usage of the contactless element, information relating to devices which are within wireless range of the contactless element and the like.

Contextual data may be obtained from a number of differing elements provided by the user mobile device (110). It should also be appreciated that the above elements and associated contextual data are exemplary and any other suitable contextual data obtainable from any suitable element of the user mobile device and/or secure mobile application may be used. Generally, contextual data may be usable in describing or may otherwise relate to one or more contexts in which the user mobile device is present.

The secure mobile application (120) may link (204) the contextual data with a trust indicator. The trust indicator may be configured for validating the contextual data (e.g. by verifying the origin of the contextual data, etc.). The trust indicator may be inextricably linked to the contextual data. I.e. the trust indicator may be impossible to disentangle or separate from the contextual data. This may be achieved using various techniques. In some implementations, the trust indicator may include an SDK which is linked to the contextual data and which is configured for validation of the contextual data. In other implementations, the trust indicator may be implemented using a shared secret which is used to encode or encrypt the contextual data. The shared secret may be known only to the secure mobile application (120) and the remote server, such that only the remote server can decode or decrypt the contextual data. Because the shared secret is unique to the secure mobile application, successful decoding or decryption of the contextual data using the shared secret may confirm the contextual data as having been received from the secure mobile application. In the implementation described with reference to FIG. 2, the trust indicator includes a digital signature of the contextual data and a digital certificate associated with the secure mobile application. The digital certificate may be a registered digital certificate. That is, the digital certificate may have been registered with the remote server in an enrolment process so as to uniquely link the digital certificate to the secure software application and user.

Linking (204) the contextual data with the trust indicator may thus include the secure mobile application (120) generating (205) a digital signature of the data. Generating the digital signature may include digitally signing the contextual data to output a digital signature of the data (or digitally signed data) which can be used in validating the origin of the data (e.g. validating that the data was received from the secure mobile application which is uniquely linked to the user). The digital signature may be any suitable digital code generated and authenticated by public key encryption which verifies the contents of the data and/or the device's identity. This may include encrypting a hash of the contextual data with the private key generated by the secure mobile application (120) and securely stored in the secure storage location. The digital signature of the data may be configured for verification using the digital certificate (122).

The secure mobile application (120) may compile (206) a payload which includes the contextual data and the trust indicator. In the embodiment described with reference to FIG. 2, this may include compiling a payload including the contextual data, digital signature and digital certificate (122). In some implementations, the payload may be encrypted to prevent interception by nefarious third parties.

The secure mobile application (120) may transmit (208) the payload to the remote server (108) associated with the fraud risk engine (104) for verification of the trust indicator and input of the data, if it is valid, as truth data into the fraud risk engine (104). Transmission of the payload to the remote server (108) may be via the communication network (114) and, in some implementations, may be via a secure communication channel established (e.g. using SSL, IPSec, etc.) between the secure mobile application (120) and the remote server (108). In some implementations, establishment of the secure communication channel may be contingent on the remote server successfully identifying the user mobile device (110) and/or secure mobile application (120) as having been registered with the remote server (108).

The operations (202 to 208) described above may repeat (209) periodically such that contextual data is obtained for transmission to the remote server (108) together with an associated trust indicator (e.g. digital signature) on an ongoing or continual basis. Contextual data may be obtained sporadically, according to a predetermined schedule (e.g. every 5 minutes, every minute, etc.), upon request from the remote server, upon the occurrence of one or more predefined events (e.g. when the user logs into the secure mobile application, etc.) or the like.

The remote server (108) may receive (210) the payload from the secure mobile application (120) executing on the user mobile device (110). The payload may include the contextual data having been obtained by the secure mobile application (120) and the trust indicator. As mentioned, the trust indicator may have various forms depending on implementation. In the illustrated embodiment, the trust indicator includes the digital signature of the contextual data and the digital certificate (122). As has been explained in the foregoing, the digital certificate (122) may be controlled by the secure mobile application (120) and in turn the trusted entity (116) and has previously been registered with the remote server (122) in association with the user (106) in an enrolment process.

The remote server (108) confirm the validity of the contextual data by verifying (211) the trust indicator. Verification of the trust indicator may include different operations, depending on the implementation. As mentioned, in some implementations, the trust indicator may include an encoding or encryption of the contextual data using a shared secret, in which case verifying the trust indicator may include decoding or decrypting the encoded or encrypted data using the shared secret.

In the illustrated embodiment, verifying (211) the trust indicator may include the remote server (108) verifying (212) the digital signature associated with the data to confirm the validity of the data. Verifying the digital signature may include decrypting the digital signature using the public key included in the digital certificate. In some cases, a hash of the contextual data may be used and verifying the digital signature may include generating a hash of the contextual data included in the payload and comparing the hash to the data obtained by decrypting the digital signature. Verifying (212) the digital signature may include validating the digital certificate with the CA.

As the public key and private key pair are generated by the secure mobile application (120), and the private key is securely stored so as to be known only to the secure mobile application (120), successful decryption may confirm the validity and/or origin of the contextual data. Validity may be confirmed by virtue of the fact that the only the secure mobile application (120), which is trusted and/or controlled by the trusted entity (116), could have obtained and digitally signed the contextual data. Origin may be confirmed by virtue of the fact that the digital certificate (122) has previously been linked to the user (106) in an enrolment process and the remote server (108) may accordingly consider the data to have originated from the user mobile device (110) in the user's control.

In some cases, verifying (212) the digital signature may include checking (213) that the digital certificate (122) included in the payload and having been used to verify the digital signature has been enrolled. Verifying the digital signature (i.e. confirming that it is valid) may give the remote server (108) reason to believe that the data was created by a known sender (authentication), that the sender cannot deny having sent the message (non-repudiation), and that the message was not altered in transit (integrity).

If (214) the trust indicator is verified, the remote server (108) may input (216) or inject the contextual data into the fraud risk engine (104) as truth data. Inputting (216) the data as truth data may include flagging the data as truth data (e.g. by activating or toggling on a "truth" or "trusted" field in a data input schema). In some implementations, inputting (216) the data as truth data may include attesting to the veracity of the data, for example by signing the data using a digital certificate issued to the remote server and which is reserved for data which has been verified as truth data. In some implementations, inputting data as truth data may include raising a confidence measure associated with the data, which confidence measure may be usable in weighting the extent to which the data is considered in updating the fraud risk profile. Inputting the data as truth data may include instructing the fraud risk engine to consider the data with a higher degree of confidence or trust.

The contextual data may be associated with a data category and inputting (216) the contextual data into the fraud risk engine may include augmenting and/or replacing existing data associated with the same data category with the newly received contextual data. The fraud risk engine (104) may use the truth data to update the fraud risk profile (102) so as to expect activity of the user which is associated with the contextual data. In some implementations, the fraud risk engine (104) may correlate or otherwise compare the truth data with conventional fraud risk data of the same category and, if the correlation or comparison between the truth data and conventional fraud risk data meets a predetermined threshold, may flag the conventional fraud risk data as suspicious and/or may augment or replace the conventional fraud risk data with the truth data. The fraud risk engine may treat the data with a higher degree of confidence or trust by virtue of it being truth data and may thus apply a higher weighting to the data than would otherwise have been applied.

If (214) verification of the digital signature fails, the contextual data associated therewith may be rejected (218) and/or discarded.

The operations of the remote server (108) described above (210 to 218) may repeat (219) each time the remote server receives a payload from the secure mobile application (120). The remote server (108) may accordingly receive payloads from the secure mobile application periodically for continual injecting of contextual data as truth data into the fraud risk engine.

Consider now an exemplary scenario in which the trusted entity (116) is a financial institution which controls the remote server (108) and the fraud risk engine (104). Inputting the data into the fraud risk engine (104) as truth data may cause the fraud risk engine (104) to accept the data as a representation of a new status quo. In the case of the contextual data including a geographical location obtained from a geographical location element associated with the user mobile device (110), the fraud risk engine (104) may update the fraud risk profile (102) to expect the user (106) to be located at that geographical location. If the user (106) then tries to interact with financial institution using another device (e.g. using the user computing device (112) to access an internet banking facility provided by the financial institution) from that (albeit completely new) location, the fraud risk engine (104) may not flag this as suspicious and may accordingly allow the requested activity (logging on to the internet banking facility, submitting a payment to a new beneficiary, etc.) to be performed, even though it is being requested from a location which the fraud risk engine previously had no knowledge of. This may happen in the background and without intervention from the user so as to significantly reduce consumer friction associated with interacting with the financial institution.

In another exemplary scenario, a transaction request may be generated by the secure mobile application and signed using the private key. Receipt of this transaction request and associated digital signature, if valid, may be sufficient information for the fraud risk engine to allow a transaction associated with the transaction request to be processed and the user may not be prompted for further authentication.

Aspects of this disclosure may accordingly enable acceleration of the rate at which the fraud risk engine (104) updates the fraud risk profile to expect new and/or changing behaviour of the user (106). Where multiple instances of correlated data may previously have been required to learn a new behaviour of the user, aspects of this disclosure may require only a single instance of digitally signed data in order to learn the new behaviour of the user.

These principles may be extended to behavioural learning algorithms which are configured to analyse user behaviour so as to be able to expect a particular behaviour from the user in the future. Aspects of the disclosure may retard efforts by nefarious third parties poisoning behavioural learning algorithms with fake data so as to hinder the efficacy of these algorithms.

Figure 3:
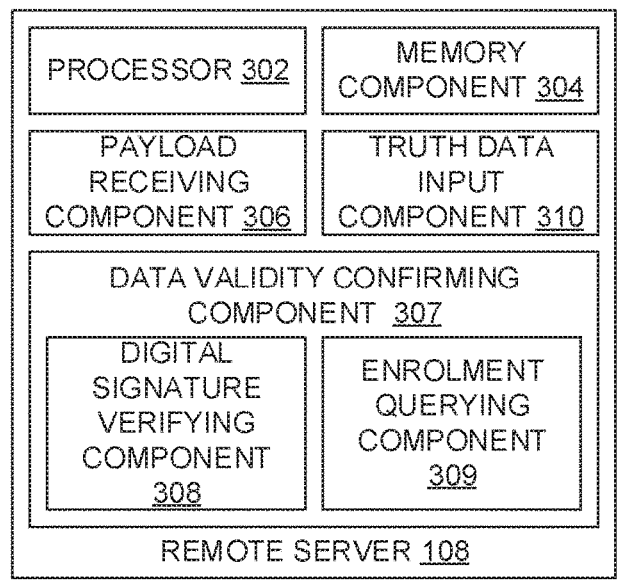
FIG. 3 is a block diagram which illustrates exemplary components which may be provided by a system for maintaining a fraud risk profile in a fraud risk engine.
Figure 3:
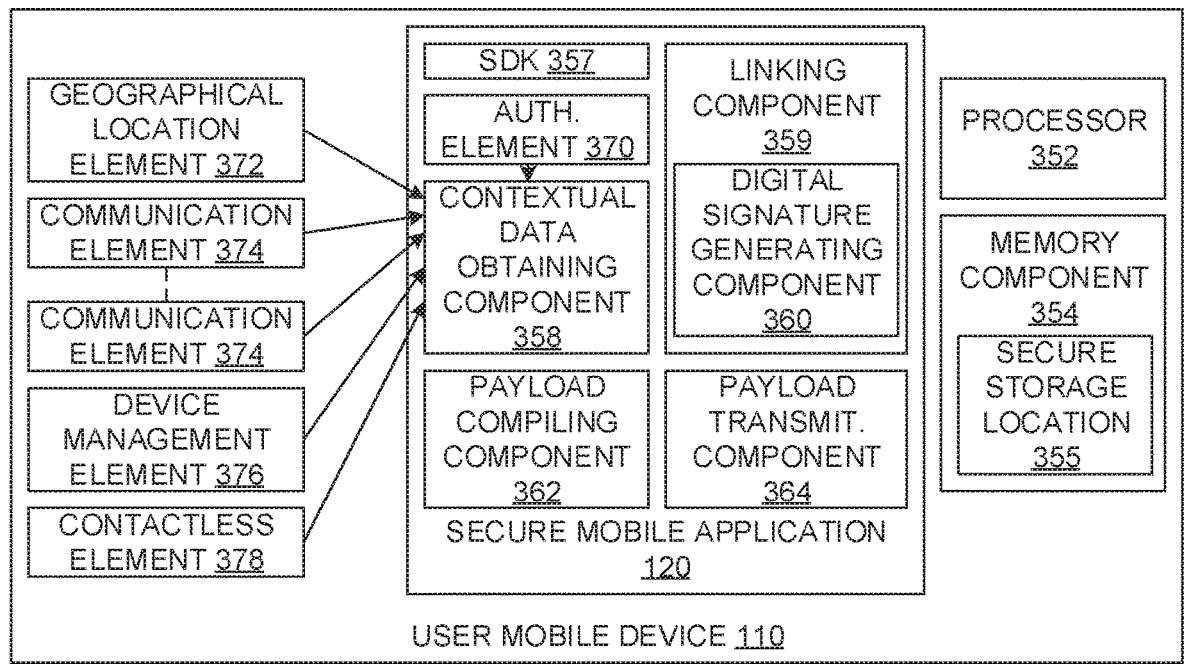

Various components may be provided for implementing the method described above with reference to FIG. 2. FIG. 3 is a block diagram which illustrates exemplary components which may be provided by a system for maintaining a fraud risk profile (102) in a fraud risk engine (104).

The remote server (108) may include a processor (302) for executing the functions of components described below, which may be provided by hardware or by software units executing on the remote server (108). The software units may be stored in a memory component (304) and instructions may be provided to the processor (302) to carry out the functionality of the described components.

The remote server (108) may include a payload receiving component (306) arranged to receive a payload from a secure mobile application executing on a user mobile device. The payload may include contextual data having been obtained by the secure mobile application and a trust indicator linked to the contextual data. The trust indicator may be configured for verifying the validity of the contextual data. In some implementations, the trust indicator may include a digital signature of the data and a digital certificate which has previously been registered with the remote server in association with the user in an enrolment process.

The remote server (108) may include a data validity confirming component (307) which may be arranged to confirm the validity of the contextual data by verifying the trust indicator. In the illustrated embodiment, the data validity confirming component (307) includes a digital signature verifying component (308) arranged to verify the digital signature associated with the data using the digital certificate to confirm the validity of the data. The digital signature verifying component (308) may further be configured to validate the digital certificate with the CA. In some implementations, the data validity confirming component (307) may include an enrolment querying component (309) arranged to query enrolment of the digital certificate (122).

The remote server (108) may include a truth data input component (310) arranged to input the data into the fraud risk engine as truth data if the trust indicator is verified.

The user mobile device (110) may include a processor (352) for executing the functions of components described below, which may be provided by hardware or by software units executing on the user mobile device (110). The software units may be stored in a memory component (354) and instructions may be provided to the processor (352) to carry out the functionality of the described components. In some cases, for example in a cloud computing implementation, software units arranged to manage and/or process data on behalf of the user mobile device (110) may be provided remotely. Some or all of the components may be provided by a secure mobile application (120) downloadable onto and executable on the user mobile device (110). In some implementations, some or all of the components of the secure mobile application (120) may be provided by an SDK (357) issued by or on behalf of, or otherwise under control of, the trusted entity.

The memory component (354) may include a secure storage location (355) configured to securely store application data of the secure software application (120). The secure storage location may be accessible only to the secure software application (and in some implementations to other authorized applications). The secure storage location may be configured to restrict access to application data stored therein to the secure software application and optionally other authorized applications.

The secure mobile application (120) may include a contextual data obtaining component (358) arranged to obtain contextual data from one or more elements of the user mobile device (110). The contextual data obtaining component (358) may be configured to interface with one or more elements of the user mobile device. Some elements may be internal to the secure software application, such as an authentication element (370), while other elements may be external to the secure software application. The authentication element (370) may for example be responsible for authenticating a user to the secure mobile application and/or remote server. The authentication element may include credentials or other data usable in authenticating the user and may also be configured to record authentication patterns and history. Exemplary external elements include a geographical location element (372), one or more communication elements (374), a device management element (376) and a contactless element (378). The contextual data obtaining component (358) may be configured to interface with the elements via suitable application programming interfaces (APIs), at least some of which may be provided by suitable SDKs. These elements and the data obtained from them are described in more detail above with reference to the method of FIG. 2.

The secure mobile application (120) may include a linking component (359) arranged to link the contextual data with a trust indicator. As mentioned, the trust indicator may take on various forms. In the illustrated embodiment, the trust indicator is in the form of a digital signature and the linking component (359) may include a digital signature generating component (360) arranged to generate a digital signature of the data. The digital signature generating component (360) may use a private key to generate the digital signature. The private key may be stored in the secure storage location (355) of the memory component (354).

The secure mobile application (120) may include a payload compiling component (362) arranged to compile a payload including the contextual data and trust indicator (e.g. digital signature and a digital certificate which has previously been registered with the remote server (108) in association with the user (106) in an enrolment process).

The secure mobile application (120) may include a payload transmitting component (364) arranged to transmit the payload to the remote server (108) associated with the fraud risk engine (104) for verification of the digital signature using the digital certificate and subsequent input of the data as truth data into the fraud risk engine.

Aspects of this disclosure may enable the use of "green signal" data (the truth data) to be used to update a fraud risk engine. The green signal data is not necessarily initiated by the user and may instead be reported silently (e.g. without user intervention) by an authorized and/or secure mobile application. Aspects of this disclosure may be applied to behavioural biometrics to confirm that these behavioural characteristics actually happened on the registered user mobile device (and, e.g., have not been passed through by a nefarious third party or so-called man in the middle). Aspects of this disclosure may be effective in reducing risks associated with data poisoning where risk engines are fed fake data by nefarious third parties to dilute their effectiveness in detecting behaviour that is out of the ordinary.

Aspects of this disclosure may relate to use of a curated credential (e.g. the registered certificate) to attest to a created credential (e.g. the contextual data). Aspects of this disclosure allow for the origin of the contextual data to be attested to by virtue of the secure mobile application signing using its secret private key and accordingly for the data to be treated differently (as a green signal), as opposed to data that is not so signed.

Aspects of this disclosure may relate to feeding a fraud risk processor with trusted content, for example as opposed to a lot of content, which can be used to establish patterns against which subsequent behaviour can be compared.

Figure 4:
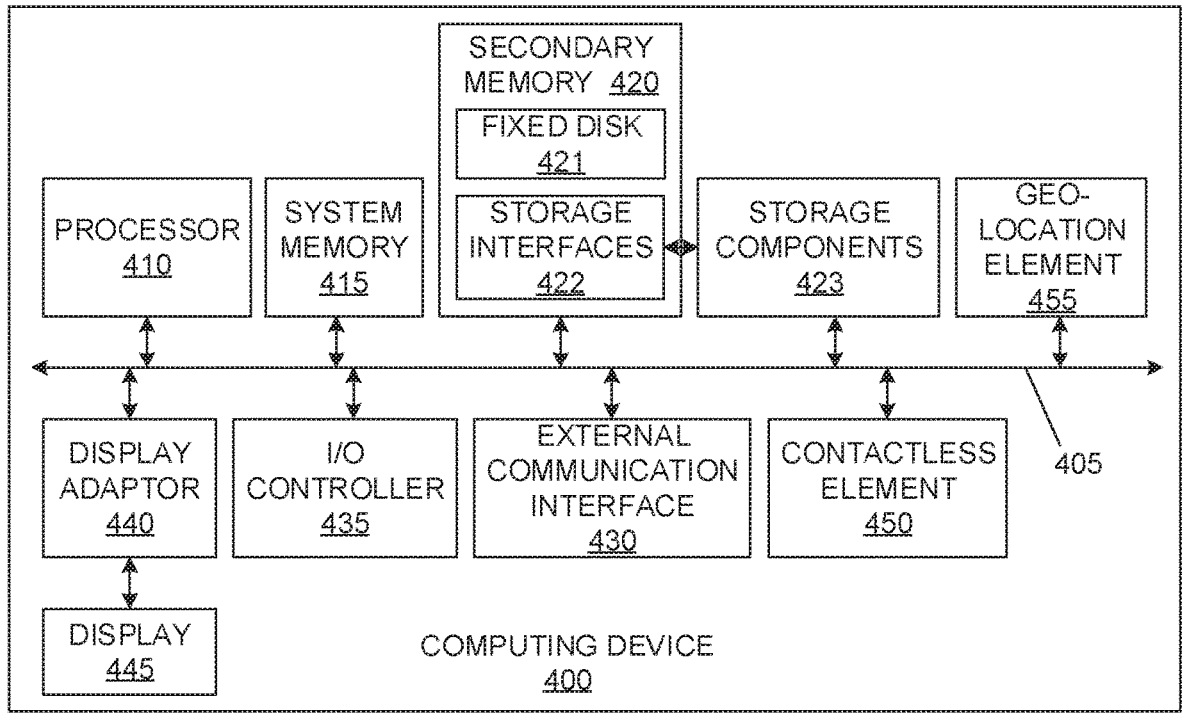
FIG. 4 illustrates an example of a computing device in which various aspects of the disclosure may be implemented.

FIG. 4 illustrates an example of a computing device (400) in which various aspects of the disclosure may be implemented. The computing device (400) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (400) may be suitable for storing and executing computer program code. The various participants and elements in the previously described system diagrams may use any suitable number of subsystems or components of the computing device (400) to facilitate the functions described herein. The computing device (400) may include subsystems or components interconnected via a communication infrastructure (405) (for example, a communications bus, a network, etc.). The computing device (400) may include one or more processors (410) and at least one memory component in the form of computer-readable media. The one or more processors (410) may include one or more of: CPUs, graphical processing units (CPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (400) may be distributed over a number of physical locations (e.g. in a distributed, cluster or cloud-based computing configuration) and appropriate software units may be arranged to manage and/or process data on behalf of remote devices.

The memory components may include system memory (415), which may include read only memory (ROM) and random access memory (RAM). A basic input/output system (BIOS) may be stored in ROM. System software may be stored in the system memory (415) including operating system software. The memory components may also include secondary memory (420). The secondary memory (420) may include a fixed disk (421), such as a hard disk drive, and, optionally, one or more storage interfaces (422) for interfacing with storage components (423), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (400) may include an external communications interface (430) for operation of the computing device (400) in a networked environment enabling transfer of data between multiple computing devices (400) and/or the Internet. Data transferred via the external communications interface (430) may be in the form of signals, which may be electronic, electromagnetic, optical, radio, or other types of signal. The external communications interface (430) may enable communication of data between the computing device (400) and other computing devices including servers and external storage facilities. Web services may be accessible by and/or from the computing device (400) via the communications interface (430).

The external communications interface (430) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (430) may include a subscriber identity module (SIM) in the form of an integrated circuit that stores an international mobile subscriber identity and the related key used to identify and authenticate a subscriber using the computing device (400). One or more subscriber identity modules may be removable from or embedded in the computing device (400).

The external communications interface (430) may further include a contactless element (450), which is typically implemented in the form of a semiconductor chip (or other data storage element) with an associated wireless transfer element, such as an antenna. The contactless element (450) may be associated with (e.g., embedded within) the computing device (400) and data or control instructions transmitted via a cellular network may be applied to the contactless element (450) by means of a contactless element interface (not shown). The contactless element interface may function to permit the exchange of data and/or control instructions between computing device circuitry (and hence the cellular network) and the contactless element (450). The contactless element (450) may be capable of transferring and receiving data using a near field communications capability (or near field communications medium) typically in accordance with a standardized protocol or data transfer mechanism (e.g., ISO 14443/NFC). Near field communications capability may include a short-range communications capability, such as radio-frequency identification (RFID), Bluetooth™, infra-red, or other data transfer capability that can be used to exchange data between the computing device (400) and an interrogation device. Thus, the computing device (400) may be capable of communicating and transferring data and/or control instructions via both a cellular network and near field communications capability.

The computer-readable media in the form of the various memory components may provide storage of computer-executable instructions, data structures, program modules, software units and other data. A computer program product may be provided by a computer-readable medium having stored computer-readable program code executable by the central processor (410). A computer program product may be provided by a non-transient computer-readable medium, or may be provided via a signal or other transient means via the communications interface (430).

Interconnection via the communication infrastructure (405) allows the one or more processors (410) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (400) either directly or via an I/O controller (435). One or more displays (445) (which may be touch-sensitive displays) may be coupled to or integrally formed with the computing device (400) via a display (445) or video adapter (440).

The computing device (400) may include a geographical location element (455) which is arranged to determine the geographical location of the computing device (400). The geographical location element (455) may for example be implemented by way of a global positioning system (GPS), or similar, receiver module. In some implementations the geographical location element (455) may implement an indoor positioning system, using for example communication channels such as cellular telephone or Wi-Fi™ networks and/or beacons (e.g. Bluetooth™ Low Energy (BLE) beacons, iBeacons™, etc.) to determine or approximate the geographical location of the computing device (400). In some implementations, the geographical location element (455) may implement inertial navigation to track and determine the geographical location of the communication device using an initial set point and inertial measurement data.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™ C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer-implemented method conducted at a remote server comprising:
   receiving, by a payload receiving component contextual data and a trust indicator linked to the contextual data from a secure application on a user device, wherein the trust indicator includes a digital signature of the contextual data;
   forwarding, by the payload receiving component, the received contextual data and trust indicator to a data validity component;
   receiving, by the data validity component, the forwarded contextual data and trust indicator;
   verifying, by the data validity component, the received digital signature using a second key;

wherein the second key is associated to a first key stored on the user device;
confirming, by the data validity component, the validity of the received contextual data;
inputting, by the data validity component, the confirmed contextual data into a risk model;
wherein the risk model is built up over time based on observations relating to the user's activity;
receiving, by a fraud risk engine, data relating to a purported user activity;
estimating, by the risk model, a likelihood that the purported user activity is an activity that is being performed by the user and/or a likelihood that the purported user activity is an activity being performed by a nefarious third-party; and
permitting, by the fraud risk engine, the purported user activity to proceed based on the likelihood that the purported user activity is being performed by the user or on a lack of the likelihood that the purported user activity is being performed by the nefarious third party.

2. The method as claimed in claim 1, wherein the trust indicator includes a digital certificate associated with the secure application, wherein confirming the validity of the contextual data includes verifying the digital signature using the digital certificate.

3. The method as claimed in claim 1, wherein the contextual data is associated with a data category, wherein inputting the confirmed contextual data into the risk model includes one or both of augmenting or replacing existing data associated with the same data category with the confirmed contextual data, and wherein the risk model uses the confirmed contextual data to update expected activity of the user.

4. The method as claimed in claim 2, including confirming the origin of the contextual data.

5. The method as claimed in claim 1, including receiving payloads including contextual data and a trust indicator from the secure application periodically for continual inputting of contextual data as confirmed contextual data into the risk model.

6. A system including a remote server comprising:
a processor;
a non-transitory memory containing instructions when executed by the processor causes the processor to perform the steps of:
receiving, by a payload receiving component, contextual data and a trust indicator linked to the contextual data from a secure application on a user device, wherein the trust indicator includes a digital signature of the contextual data;
forwarding, by the payload receiving component, the received contextual data and trust indicator to a data validity component;
receiving, by the data validity component, the forwarded contextual data and trust indicator;
verifying, by the data validity component, the received digital signature using a second key;
wherein the second key is associated to a first key stored on the user device;
confirming, by the data validity component, the validity of the received contextual data;
inputting, by the data validity component, the confirmed contextual data into a risk model;
wherein the risk model is built up overtime based on observations relating to the user's activity;
receiving, by a fraud risk engine, data relating to a purported user activity;
estimating, by the risk model, a likelihood that the purported user activity is an activity that is being performed by the user and/or a likelihood that the purported user activity is an activity being performed by a nefarious third-party; and
permitting, by the fraud risk engine, the purported user activity to proceed based on the likelihood that the purported user activity is being performed by the user or on a lack of the likelihood that the purported user activity is being performed by the nefarious third party,
estimating, by the risk model, a likelihood that the purported user activity is an.

7. The system as claimed in claim 6, including the user device having a non-transitory memory for storing computer-readable program code and a processor for executing the computer-readable program code, when executed by the processor causes the processor to perform the steps of:
obtaining, by an obtaining component, contextual data from an element of the user device;
linking, by a linking component, the contextual data with a trust indicator including a digital signature of the contextual data generated by the secure application using the first key stored on the user device; and,
transmitting, by a transmitting component, the contextual data and trust indicator linked to the contextual data to the remote server.

8. The system as claimed in claim 6, wherein trust indicator is inextricably linked to the contextual data.

9. The system as claimed in claim 6, wherein the trust indicator includes the digital signature of the contextual data and a digital certificate associated with the secure application, wherein the digital certificate is a registered digital certificate, the digital certificate having been compiled or created by the secure application, and wherein the digital certificate is controlled by the secure application.

10. The system as claimed in claim 6, wherein the contextual data includes one or more of: location data relating to a geographical location; user authentication data; connectivity data; and, user device usage data.

11. The system as claimed in claim 6, wherein the second key is registered with the with the remote server in an enrolment process.

12. The method as claimed in claim 1, including, if the digital signature is not verified, rejecting the contextual data linked thereto.

13. The method as claimed in claim 1, wherein the fraud risk engine evaluates a risk of an activity of a user associated with the user device.

* * * * *

UNITED STATES PATENT AND TRADEMARK OFFICE
CERTIFICATE OF CORRECTION

PATENT NO. : 11,763,309 B2
APPLICATION NO. : 16/966448
DATED : September 19, 2023
INVENTOR(S) : Dewald de Ridder Nolte Page 1 of 1

It is certified that error appears in the above-identified patent and that said Letters Patent is hereby corrected as shown below:

In the Specification

In Column 14, Line 13, delete "(CPUs)," and insert --(GPUs),--.

In Column 16, Line 15, delete "JavaTM" and insert --JavaTM,--.

In the Claims

In Column 17, Claim 6, Line 59, delete "device:" and insert --device;--.

In Column 18, Claim 6, Lines 19-21, delete "party, estimating, by the risk model, a likelihood that the purported user activity is an." and insert --party.--.

Signed and Sealed this
Twenty-seventh Day of February, 2024

Katherine Kelly Vidal
*Director of the United States Patent and Trademark Office*